United States Patent [19]

Vermillion

[11] Patent Number: 4,755,066
[45] Date of Patent: Jul. 5, 1988

[54] SELF-ALIGNING BEARING ASSEMBLY

[75] Inventor: Don W. Vermillion, Anderson, S.C.

[73] Assignee: The Singer Company, Stamford, Conn.

[21] Appl. No.: 37,363

[22] Filed: Apr. 13, 1987

[51] Int. Cl.$^4$ .............................................. F16C 25/04
[52] U.S. Cl. ..................................................... 384/202
[58] Field of Search ............... 384/202, 125, 203, 204, 384/209, 208, 207

[56] References Cited

U.S. PATENT DOCUMENTS

| | | |
|---|---|---|
| 1,924,072 | 8/1933 | Lavigne . |
| 2,813,762 | 11/1957 | Bridenbaugh . |
| 2,886,380 | 5/1959 | Lambeek ............................ 384/202 |
| 2,938,755 | 5/1960 | Lee et al. . |
| 3,701,574 | 10/1972 | Phillips . |
| 3,754,802 | 8/1973 | Keller . |
| 3,770,990 | 11/1973 | Winkelman . |
| 3,940,836 | 3/1976 | McCloskey ......................... 384/202 |
| 4,074,158 | 2/1978 | Cole . |
| 4,453,838 | 6/1984 | Loizeau .............................. 384/125 |

Primary Examiner—Lenard A. Footland
Attorney, Agent, or Firm—David L. Davis

[57] ABSTRACT

A self-aligning sleeve bearing assembly including a base member having a surface which includes a socket, a retaining member, and a bearing extending into and from the socket and being sandwiched between the base member and retaining member. The bearing includes two opposing halves which are mismatched along a parting line. The retaining member includes two pairs of independently yieldable opposed fingers which provide four independently operating spring retainers which bear against respective surfaces of the opposing bearing halves and operate together to retain the bearing in place yet allow self-alignment of the bearing.

12 Claims, 3 Drawing Sheets

SELF-ALIGNING BEARING ASSEMBLY

BACKGROUND OF THE INVENTION

1. Field of the Invention

The present invention relates to a self-aligning bearing assembly including a bearing retainer which changes its form to compensate for a bearing having an irregular profile.

2. Description of the Prior Art

The use of self-aligning bearing assemblies is known in the art. Such assemblies include a support having a recess in which a bearing rests, the bearing being retained in place by a retaining member which engages the surface of the bearing to sandwich the bearing between the support and the retaining member. The retaining member is affixed to the support to hold the bearing in place relative thereto. Such an assembly is used to support a rotatable shaft on a fixed structure. Examples of such self-aligning bearing assemblies are to be found in U.S. Pat. Nos. 2,813,762 to Bridenbaugh and 2,938,755 to Lee et al. In these patents, a bearing is described having a bore which extends generally perpendicular to the support. A rotatable shaft extends through the bore and through an opening in the support in such a manner that the shaft is generally oriented perpendicular to the support.

A somewhat related structure is to be found in U.S. Pat. No. 4,074,158 to Cole. This patent describes an electric motor having a motor shaft which is supported by self-aligning bearings which are sandwiched between retaining members and a portion of the rotor assembly.

In other known similar self-aligning bearing assemblies the bearing is completely supported by a retaining member having a plurality of fingers which extend therefrom at oppositely and alternately spaced positions to engage the bearing surface. Examples of such self-aligning bearing assemblies are to be found in U.S. Pat. Nos. 1,924,072; 3,701,574; and 3,754,802, to Lavigne, Phillips and Keller, respectively.

A somewhat related structure is to be found in U.S. Pat. No. 3,770,990 to Winkelmann. This patent describes a bearing structure for a rotatable shaft wherein the assembly includes a splitring bearing. Each section of the bearing is retained by a respective retainer ring having a plurality of circumferentially spaced fingers which extend radially to provide a bearing cage for the respective bearing section.

The primary function of a self-aligning bearing assembly is to provide precise alignment of a rotating shaft relative to the structure to which it is affixed. It is typical to construct such assemblies using spherical or partially spherical bearing members or bearing members in the form of a cylindrical sleeve which have been molded from powdered metal. For examples, it is known to construct such bearing members from ferrous or non-ferrous materials such as powdered iron, iron-bronze or bronze. In producing such a bearing member by molding, compressed powder metal is tamped into two mold halves which are closed together in a known manner. When the bearing member is removed from the mold, there is a tendency for a mismatch to occur at the parting line between opposing halves of the molded bearing. For example, FIGS. 1 and 2 schematically depict a bearing in the form of sleeve bearing 2 which has been molded from powder metal in a known manner, bearing 2 including opposing halves 4 and 6. It will be noted that the two halves are offset or mismatched at the parting line 8. Such a mismatch has an adverse affect upon the comptability of the bearing with the bearing retainer and base or housing. In particular, when the bearing is mounted such that the bore 10 through which the rotatable shaft 12 extends is horizontal relative to a supporting surface 14 depicted in phantom lines in FIG. 2, it is difficult, if possible at all, to use sufficient even pressure to retain the bearing in place and yet allow the bearing to inherently self-align.

It is highly desirable to provide a self-aligning bearing assembly capable of functioning in a satisfactory manner notwithstanding that the bearing has been molded from power metal such that there is a mismatch at the parting line between opposing halves of the molded bearing.

It is also desirable to provide a self-aligning bearing assembly and retainer member therefor which compensates for an irregular bearing profile.

It is further desirable to provide a retaining member, for use in a self-aligning bearing assembly, which retains a bearing having an irregular profile in place using constant pressure and yet allows the bearing to inherently self-align.

SUMMARY OF THE INVENTION

This invention achieves these and other results by providing a self-aligning bearing assembly comprising a bearing having opposing halves which are mismatched at a parting line. A base member is provided having means formed therein for providing a socket into and from which such bearing extends. A retainer is attached to the base member for retaining the bearing in the socket, and to this end the bearing is sandwiched between the retainer and the base member. The retainer included two pairs of independently yieldable opposed fingers which provide four independently operating spring retainers which operate together to retain the bearing in place yet allow self-alignment of the bearing. One pair of such fingers is urged against a portion of a surface of one of the opposing halves of the bearing. The other pair of such fingers is urged against a portion of a surface of the other opposing half of the bearing. The pairs of fingers are spaced from each other along the parting line.

DESCRIPTION OF THE PREFERRED EMBODIMENT

Figure 1:
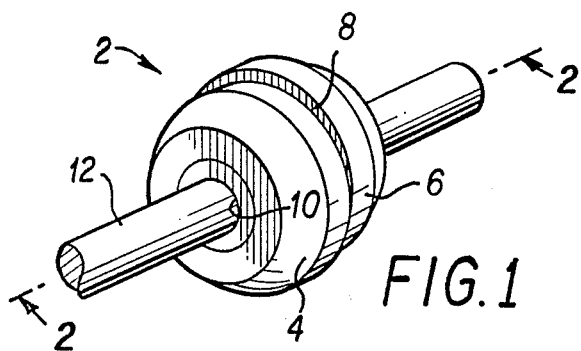
FIG. 1 is a perspective view of a molded bearing having two opposing halves which are mismatched at a parting line.
Figure 2:
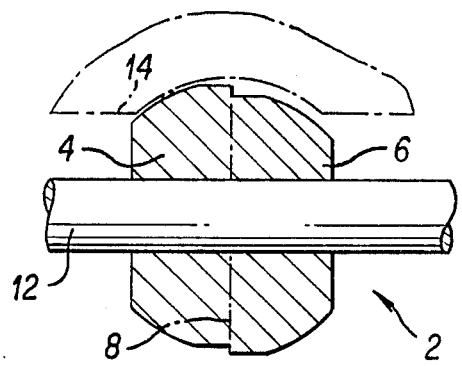
FIG. 2 is a view of the bearing of FIG. 1 taken along lines 2—2, including a base surface shown in phantom lines.

The embodiment of this invention illustrated in FIGS. 3 to 9 is particularly suited for achieving the objects of this invention. In particular, a self-aligning bearing assembly is depicted comprising a base 20, bearing member 30, and retaining means 50. The base 20 includes an outer surface 22 which includes a socket 24 disposed inwardly from surface 22. Socket 24 includes a first surface 26 and a second surface 28.

Bearing member 30 extends into and from socket 24. Bearing member 30 includes a shaft-receiving bore 32 extending therethrough. Shaft 34 extends through bore 32 in a known manner. Shaft-receiving bore 32 extends in a first direction along an axis 36 which is coextensive with or parallel to the outer surface 22. In the embodiment depicted in the drawings, axis 36 is parallel to surface 22. Bearing member 30 includes first and second opposing halves 38 and 40, respectively, which are mismatched at a parting line 42 located between halves 38 and 40, the parting line 42 circumscribing axis 36 and lying in a plane 44 which extends at an angle equal to 90° relative to axis 36. It will be noted that the shaft receiving bore 32 extends through halves 38 and 40 and through the center of the bearing member. As will be explained in greater detail hereinafter, part of surface 26 engages the first opposing half 38 of the bearing member and part of surface 28 engages the second opposing half 40 of the bearing member.

Figure 6:
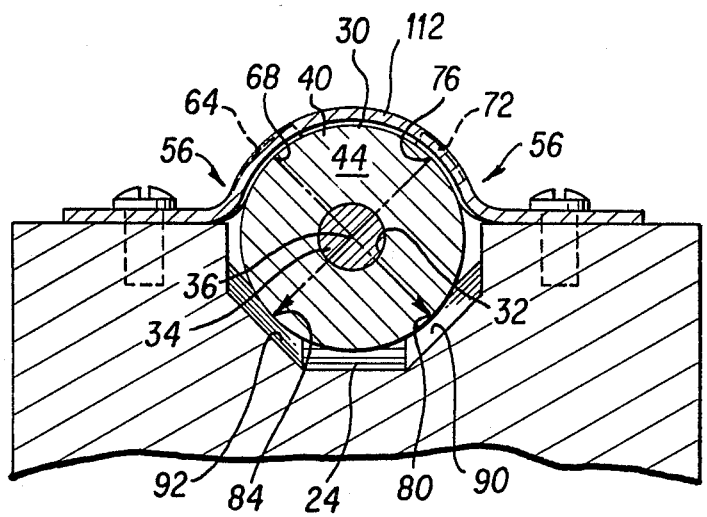
FIG. 6 is a view of FIG. 3 taken along lines 6—6.

Retaining means 50 is attached to outer surface 22 as, for example, by screws 52, for retaining the bearing member 30 in contact with the first surface 26 and second surface 28 of socket 24. Retaining means 50 includes a first pair 54 of opposing retaining fingers which engage the first opposing half 38 of the bearing member (FIG. 7) and a second pair 56 of opposing retaining fingers which engage the second opposing half 40 of the bearing member (FIG. 6). The first pair 54 and the second pair 58 are spaced as at 60 in the direction of axis 36 to provide an open space at the parting line 42. Such spacing 60 is identified in FIG. 4.

Figure 7:
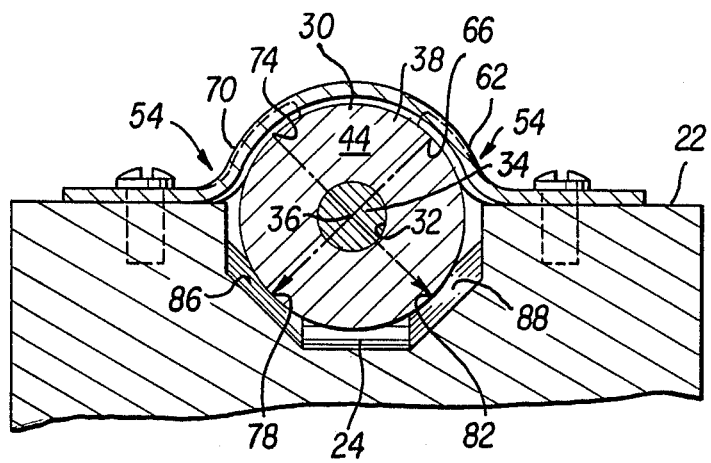
FIG. 7 is a view of FIG. 3 taken along lines 7—7.

As best depicted in FIGS. 6 and 7, the first and second pair of opposing retaining fingers each includes a first finger 62 and 64 which, respectively, exert first forces against first portions of respective of the first and second opposing halves of the bearing member. For example, first finger 62 exerts a force against a first portion 66 of the first opposing half 38 of the bearing member, and first finger 64 exerts a force against a first portion 68 of the second opposing half 40 of the bearing member. In a like manner, the first and second pair of opposing retaining fingers each includes a second finger 70 and 72 which, respectively, exert second forces against second portions of respective of the first and second opposing halves of the bearing member. For example, second finger 70 exerts a force against a second portion 74 of the first opposing half 38 of the bearing member, and second finger 72 exerts a force against a second portion 76 of the second opposing half 40 of the bearing member. The line of action of the force exerted by each finger extends from the finger through the axis 36 to a respective opposing portion of the surfaces 26 and 28. For example, the line of action of the force exerted by finger 62 extends from finger 62 through axis 36 to an opposing first portion 78 of first surface 26 of socket 24, and the line action of the force exerted by finger 64 extends from finger 64 through axis 36 to an opposing first portion 80 of second surface 28 of socket 24. In a like manner, the line of action of the force exerted by finger 70 extends from finger 70 through axis 36 to an opposing second portion 82 of first surface 26 of socket 24, and the line of action of the force exerted by finger 72 extends from finger 72 through axis 36 to an opposing second portion 84 of second surface 28. Each respective line of action extends through the centerline of the bearing.

Figure 8:
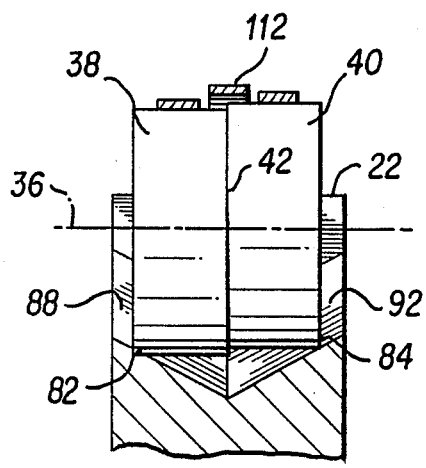
FIG. 8 is a view of FIG. 3 taken along lines 8—8.

The opposing first and second portions 78 and 82 of the first surface 26 lie in a first plane 86 and a second plane 88, respectively. In a like manner, the opposing first and second portions 80 and 84 of the second surface 28 lie in a third plane 90 and a fourth plane 92, respectively. Socket 24 comprises the first and second portions of the first and second surfaces. By properly orienting surfaces 26 and 28 it is possible to obtain point contact between the surfaces 26 and 28 and the bearing portion of the bearing member which engages such surfaces. Such point contact is obtained by orienting the surfaces such that the first and second planes 86, 88 extend downward towards each other from outer surface 22 (FIG. 7), the third and fourth planes 90, 92 extend downward towards each other from outer surface 22 (FIG. 6), the first and third planes 86, 90 extend downward towards each other from outer surface 22 (FIG. 9), and the second and fourth planes 88, 92 extend downward towards each other from outer surface 22 (FIG. 8).

Figure 3:
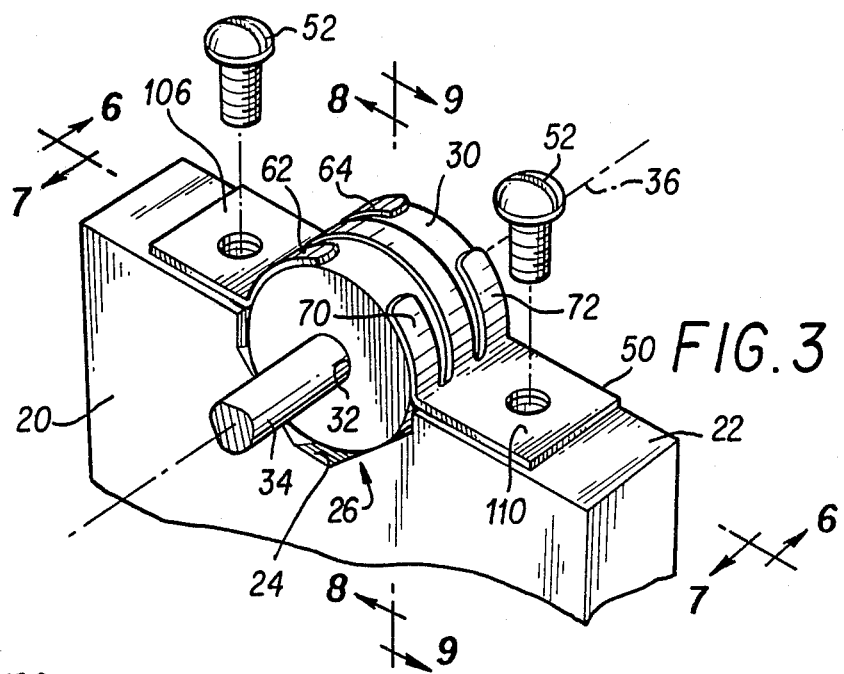
FIG. 3 is a perspective view of a self-aligning bearing assembly of the present invention.
Figure 9:
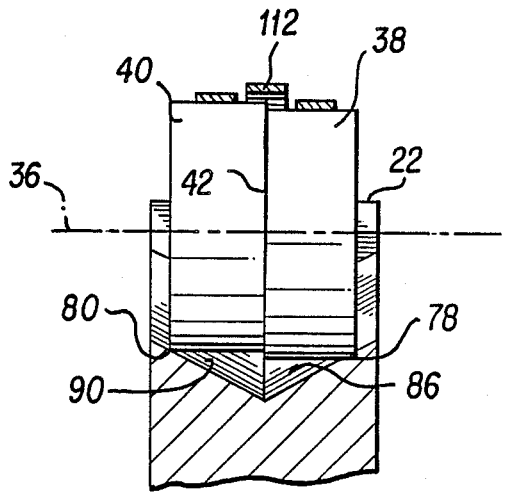
FIG. 9 is a view of FIG. 3 taken along lines 9—9.

In the retaining means 50, the first and second fingers 62, 70 of the first pair 54 of opposing retaining fingers each include a first end 100 which are oriented towards and spaced from each other. In a like manner, the first and second fingers 64, 72 of the second pair 56 of opposing retaining fingers each include a first end 102 which are oriented towards and spaced from each other. Finger 62 and finger 64 each have a second end 104 each of which is joined to a first mounting flange 106 which is attached to outer surface 22 as depicted in FIG. 3. In a like manner, finger 70 and finger 72 each have a second end 108 each of which is joined to a second mounting flange 110 which is also attached to outer surface 22 as depicted in FIG. 3. The first mounting flange 106 and the second mounting flange 110 are joined by a bridging member 112, the bridging member being spaced from the bearing member in the bearing assembly as depicted in FIGS. 8 and 9.

By providing a self-aligning bearing assembly as described herein having a retaining means 50 formed from a spring-like material such as spring steel, the fingers of the retaining means impart a retaining force to hold the bearing in place and yet change form to compensate for a bearing having an irregular profile to allow selfalignment thereof. The bridging member 112 is particularly useful in applications where the self-aligning bearing assembly might be subjected to high impact, as for example, where the assembly is used in a tool such as a drill which might be dropped during use. In particular, the bridging member 112 allows the spring fingers to stay within their elastic limits so that the spring fingers are not overstressed, and movement of the bearing is limited accordingly.

Figure 10:
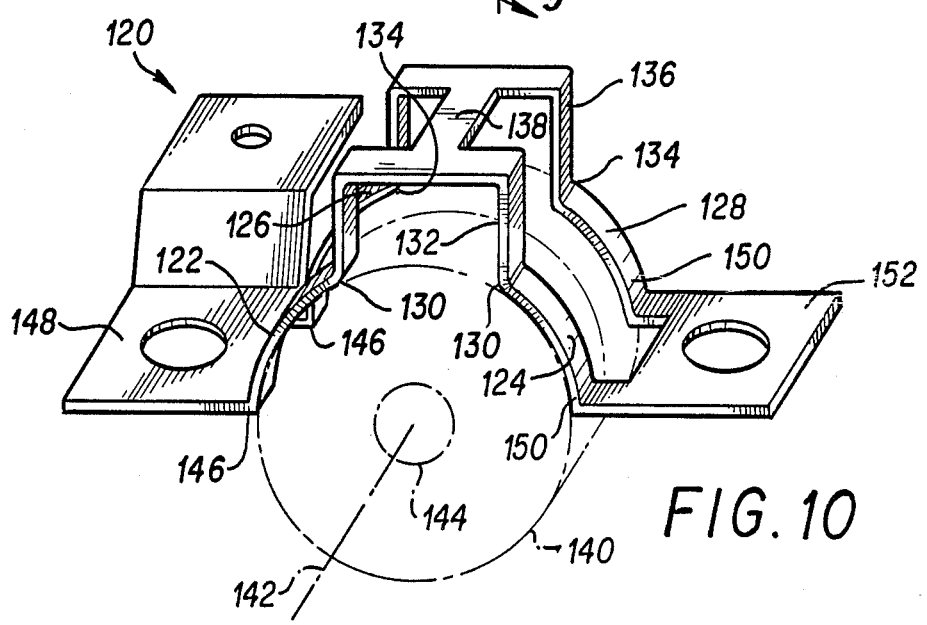
FIG. 10 is a perspective view of another embodiment of the retaining member of the present invention.
Figure 4:
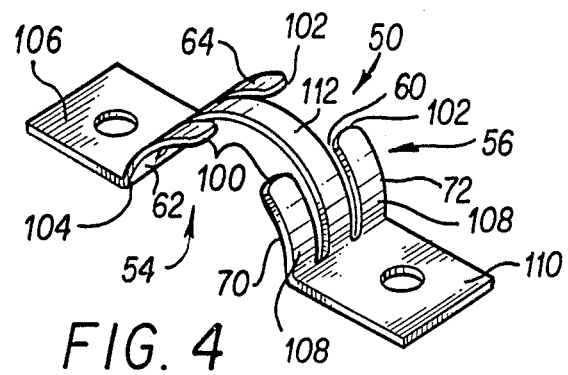
FIG. 4 is a perspective view of one embodiment of the retaining member of the present invention.
Figure 5:
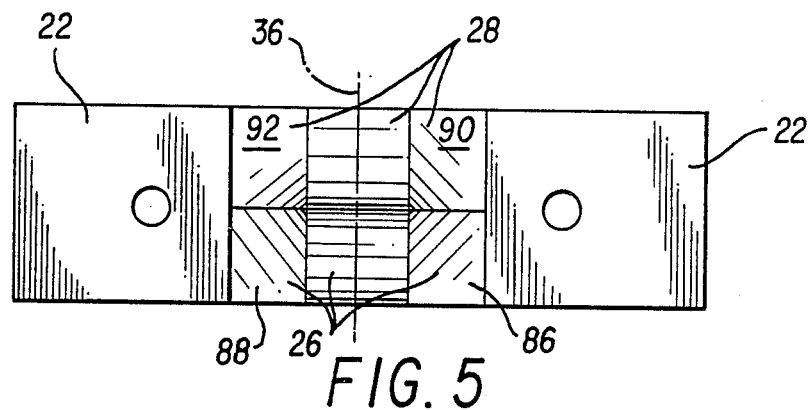
FIG. 5 is a plan view of the assembly of FIG. 3 with the bearing and retaining member having been omitted to simplify the view.

In an alternative embodiment as depicted in FIG. 10 a retaining means 120 includes first and second fingers 122, 124 of a first pair of opposing fingers and first and second fingers 126, 128 of a second pair of opposing fingers. Fingers 122, 124 each include a first end 130 which are jointed together by a first bridging member 132. In a like manner, fingers 126, 128 each include a first end 134 which are joined together by a second bridging member 136. The first bridging member 132 and the second bridging member 136 are joined together by a third bridging member 138. Bridging members 132, 136 and 138 are spaced from the bearing member shown in phantom lines at 140, and the third bridging member 138 extends in the direction of the axis 142 of the shaft bore 144. Fingers 122 and 126 each have a second end 146 which are joined to a first mounting flange 148. Similarly, fingers 124 and 128 each have a second end 150 which are joined to a second mounting flange 152. Mounting flanges 148 and 152 can be attached to the outer surface 22 of base 20 in the same manner described regarding retaining means 50.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A self-aligning bearing assembly comprising:
   a base member;
   a bearing having opposing halves;
   means formed within said base member for providing a socket for said bearing, said bearing extending into and from said socket; and
   a retainer having two pairs of independently yieldable opposed fingers, one of said pairs engaging a portion of a surface of one of said opposing halves and the other of said pairs engaging a portion of a surface of the other of said opposing halves, said retainer being attached to said base member, said bearing being sandwiched between said retainer and said base member, and said pairs being spaced along said parting line.

2. A self-aligning bearing assembly comprising a base having an outer surface which includes a socket disposed inwardly from said outer surface, a bearing member extending into and from said socket, said bearing member having first and second opposing halves meeting at a parting line located between said hales, said bearing member having a shaft receiving bore extending through said halves, said socket having a first surface, part of which engages said first opposing half, and a second surface, part of which engages said second opposing half, and means attached to said outer surface for retaining said bearing member in contact with said first and second surfaces of said socket, said retaining means including a first pair of opposing retaining fingers which engage said first opposing half of said bearing member and a second pair of opposing retaining fingers which engage said second opposing half of said bearing member, said first and second pairs of opposing fingers being spaced to provide an open space at said parting line.

3. The self-aligning bearing assembly of claim 2 wherein said shaft receiving bore extends through the center of said bearing member in a first direction along an axis coextensive with or parallel to said outer surface, wherein said parting line lies in a plane which extends at an angle equal to 90° relative to said axis, and wherein said first and second pairs of opposing fingers are spaced in the direction of said axis.

4. The self-aligning bearing assembly of claim 3 wherein said first and second pair of opposing retaining fingers each includes a first finger which, respectively, exert first forces against first portions of respective of said first and second opposing halves of said bearing member, the lines of action of said first forces extending from said first fingers, through said axis, to an opposing first portion of said part of respective of said first and second surfaces of said socket, and said first and second pair of opposing retaining fingers each includes a second finger which, respectively, exert second forces against second portions of respective of said first and second opposing halves of said bearing member, the lines of action of said second forces extending from said second fingers, through said axis, to an opposing second portion of said part of respective of said first and second surfaces of said socket.

5. The self-aligning bearing assembly of claim 4 wherein said opposing first and second portion of said part of said first surface of said socket lie in a first plane and a second plane, respectively, said opposing first and second portion of said part of said second surface of said socket lie in a third plane and a fourth plane, respectively, said socket comprising said first and second portions of said part of said first and second surfaces wherein said first plane and said second plane extend downward towards each other from said outer surface, said third plane and said fourth plane extend downward towards each other from said outer surface, said first plane and said third plane extend downward towards each other from said outer surface, and said second plane and said fourth plane extend downward towards each other from said outer surface.

6. The self-aligning bearing assembly of claim 4 wherein said first and second fingers of said first pair of opposing retaining fingers each include a first end which are joined together by a first bridging member, and said first and second fingers of said second pair of opposing retaining fingers each include a corresponding first end which are joined together by a second bridging member.

7. The self-aligning bearing assembly of claim 6 wherein said first and second bridging members are joined together by a third bridging member.

8. The self-aligning bearing assembly of claim 7 wherein said first, second and third bridging members are spaced from said bearing member, and said third bridging member extends in the direction of said axis.

9. The self-aligning bearing assembly of claim 8 wherein said first finger of said first pair of opposing retaining fingers and said first finger of said second pair of opposing retaining fingers each have a second end which is joined to a first mounting flange which is attached to said outer surface, and said second finger of said first pair of opposing retaining fingers and said second finger of said second pair of opposing retaining fingers each have a second end which is joined to a second mounting flange which is attached to said outer surface.

10. The self-aligning bearing assembly of claim 4 wherein said first and second fingers of said first pair of opposing retaining fingers each include a first end which are oriented towards and spaced from each other, and said first and second fingers of said second pair of opposing retaining fingers each include a first end which are oriented towards and spaced from each other.

11. The self-aligning bearing assembly of claim 10 wherein said first finger of said first pair of opposing retaining fingers and said first finger of said second pair of opposing retaining fingers each have a second end which is joined to a first mounting flange which is attached to said outer surface, and said second finger of said first pair of opposing retaining fingers and said second finger of said second pair of opposing retaining fingers each have a second end which is joined to a second mounting flange which is attached to said outer surface.

12. The self-aligning bearing assembly of claim 10 wherein said first and second mounting flanges are joined by a bridging member, said bridging member being spaced from said bearing member.

* * * * *